US009582185B2

(12) United States Patent
Huang et al.

(10) Patent No.: US 9,582,185 B2
(45) Date of Patent: Feb. 28, 2017

(54) METHOD FOR SCALE ADJUSTMENT OF TOUCH-BASED MEASUREMENT EQUIPMENT

(71) Applicant: Good Will Instrument Co., Ltd., New Taipei (TW)

(72) Inventors: Yuan-Long Huang, New Taipei (TW); De-En Yan, New Taipei (TW)

(73) Assignee: Good Will Instrument Co., Ltd., New Taipei (TW)

( * ) Notice: Subject to any disclaimer, the term of this patent is extended or adjusted under 35 U.S.C. 154(b) by 439 days.

(21) Appl. No.: 14/297,084

(22) Filed: Jun. 5, 2014

(65) Prior Publication Data

US 2015/0355834 A1 Dec. 10, 2015

(51) Int. Cl.
*G06F 3/0484* (2013.01)
*G06F 3/0488* (2013.01)
*G06F 1/02* (2006.01)
*G06F 3/01* (2006.01)

(52) U.S. Cl.
CPC ...... *G06F 3/04883* (2013.01); *G06F 3/04847* (2013.01); *G06F 1/022* (2013.01); *G06F 3/017* (2013.01); *G06F 3/0484* (2013.01); *G06F 3/04842* (2013.01); *G06F 2203/04806* (2013.01)

(58) Field of Classification Search
CPC ............ G06F 3/04883; G06F 3/04847; G06F 3/04842; G06F 3/017; G06F 2203/04806; G06F 1/022; A61B 5/044; A61B 5/7235
See application file for complete search history.

(56) References Cited

U.S. PATENT DOCUMENTS

| 9,021,387 | B2* | 4/2015 | Ikeda | G06F 3/04883 715/716 |
| 2006/0026536 | A1* | 2/2006 | Hotelling | G06F 3/0418 715/863 |
| 2010/0194677 | A1* | 8/2010 | Fiebrink | G06F 3/04847 345/156 |
| 2012/0108328 | A1* | 5/2012 | Konno | H04N 13/0497 463/31 |
| 2014/0114190 | A1* | 4/2014 | Chiang | G06F 3/0488 600/440 |
| 2014/0222340 | A1* | 8/2014 | Celia | G01C 21/32 701/533 |
| 2015/0067497 | A1* | 3/2015 | Cieplinski | G06F 3/016 715/702 |

* cited by examiner

*Primary Examiner* — Ting Lee
(74) *Attorney, Agent, or Firm* — C. G. Mersereau; Nikolai & Mersereau, P.A.

(57) ABSTRACT

A method for scale adjustment of touch-based measurement equipment has steps of providing a touch-based screen with a waveform area; determining if a first-direction gesture or a second-direction gesture is present on the waveform area; when the first-direction gesture is present, determining if an object touches one of two portions of the waveform area divided along a second direction of the waveform area and incrementing or decrementing a first scale when positive; and when the second-direction gesture is present, determining if an object touches one of two portions of the waveform area divided along a first direction of the waveform area and incrementing or decrementing a second scale. Scale adjustment on touch-based measurement equipment using one finger can be implemented with the foregoing method.

20 Claims, 11 Drawing Sheets

METHOD FOR SCALE ADJUSTMENT OF TOUCH-BASED MEASUREMENT EQUIPMENT

BACKGROUND OF THE INVENTION

1. Field of the Invention

The present invention relates to a method for changing scale of touch-based measurement equipment, and more particularly to a method capable of realizing stepwise scale adjustment of touch-based measurement equipment with one single finger.

2. Description of the Related Art

Measurement equipment, such as oscilloscope, spectrum analyzer and the like, serves to display waveforms of testing signals. Given the oscilloscope as an example, the values of a displayed waveform on the oscilloscope in vertical and horizontal axes respectively represent magnitude and time of the waveform. To precisely acquire the values in the vertical and horizontal axes or prevent the displayed waveform from going out of bound vertically or horizontally, frequently adjusting stepwise scales, such as 1×, 10×, 100×, 1000× and the like, becomes essential. The most traditional way of adjusting scale is to adjust scale through a knob. After a touch screen is applied to the foregoing measurement equipment, touch-based scale adjustment is also supported and can be classified into two types as follows.

One type of touch-based scale adjustment is performed by using two-finger pinch gesture and is advantageous in its intuitive operation. However, a distance between the two fingers in the pinch gesture is hard to be controlled precisely such that stepwise scale adjustment is not easy to be implemented.

The other type of touch-based scale adjustment is performed by touching virtual buttons on the touch screen. With reference to FIG. 9, a conventional touch screen 70 of an oscilloscope has a waveform area 71 for displaying a waveform of a testing signal. The waveform area 71 has multiple virtual buttons 72, 73 located on a lower portion below the waveform area 71. When one of the virtual buttons 72 is touched, a popup window for horizontal scale adjustment 720 is displayed on the waveform area 71 as shown in FIG. 10. The popup window for horizontal scale adjustment 720 has a track bar 721 that is horizontally movable for users to perform a stepwise scale adjustment in the horizontal direction (time) upon pressing and dragging it to the right or to the left. When the other virtual button 73 is touched, a popup window for vertical scale adjustment 730 is displayed on the waveform area 71 as shown in FIG. 11. The popup window for vertical scale adjustment 730 has at least one track bar 731 that is vertically movable for users to perform a stepwise scale adjustment in the vertical direction (magnitude) upon pressing and dragging it to the top or to the bottom.

Although the foregoing virtual buttons 72, 73 can be used for scale adjustment, the issue of operational inconvenience still exists. To ensure better view for observing the waveform area 71, the virtual buttons 72, 73 below the waveform area 71 and the popup windows 720, 730 should be reduced in size as much as possible. Due to the size reduction, the virtual buttons 72, 73 and the track bars 721, 731 in the popup windows 720, 730 that are relatively smaller give rise to difficulty in operation and an unfriendly users' interface for scale adjustment.

SUMMARY OF THE INVENTION

An objective of the present invention is to provide a method for scale adjustment of touch-based measurement equipment capable of providing larger area to a touch sensitive range and realizing single-finger stepwise scale adjustment.

To achieve the foregoing objective, the method for scale adjustment of touch-based measurement equipment has steps of:

providing a touch-based screen of measurement equipment with a waveform area;

determining if a first-direction gesture or a second-direction gesture is present on the waveform area;

when determining that the first-direction gesture is present on the waveform area, determining if an object touches one of two portions of the waveform area divided along a second direction of the waveform area;

when the object touches one of the two portions of the waveform area divided along the second direction, incrementing or decrementing a first scale of testing signals in a stepwise manner under a first scale adjustment mode;

when determining that the second-direction gesture is present on the waveform area, determining if an object touches one of two portions of the waveform area divided along a first direction of the waveform area; and when the object touches one of the two portions of the waveform area divided along the first direction, incrementing or decrementing a second scale of testing signals in a stepwise manner under a second scale adjustment mode.

The waveform area in the foregoing method serves as an operation area for scale adjustment, which renders a relatively larger touch sensitive range. The foregoing method first determines if a first-direction gesture or a second-direction gesture is present on the waveform area of the touch screen. When the first-direction gesture is determined to be present on the waveform area, the first scale adjustment mode is entered. When a single-object touch event is detected on one of the two portions of the waveform area divided along the second direction of the waveform area, the first scale is incremented in a stepwise manner. When a single-object touch event is detected on the other portion of the waveform area, the first scale is decremented in a stepwise manner. Similarly, when a single-object touch event is detected on one of the two portions of the waveform area divided along the first direction of the waveform area, the second scale is incremented in a stepwise manner. When a single-object touch event is detected on the other portion of the waveform area, the second scale is decremented in a stepwise manner.

The advantages of the foregoing method are as follows.

1. Users gain a relatively larger range for operation of scale adjustment to significantly enhance operational convenience for scale adjustment.

2. Users just need a particular gesture to enter a scale adjustment mode and adjust scale in a stepwise manner with single-finger clicking so as to further enhance operational convenience for scale adjustment.

Other objectives, advantages and novel features of the invention will become more apparent from the following detailed description when taken in conjunction with the accompanying drawings.

DETAILED DESCRIPTION OF THE INVENTION

Figure 1:
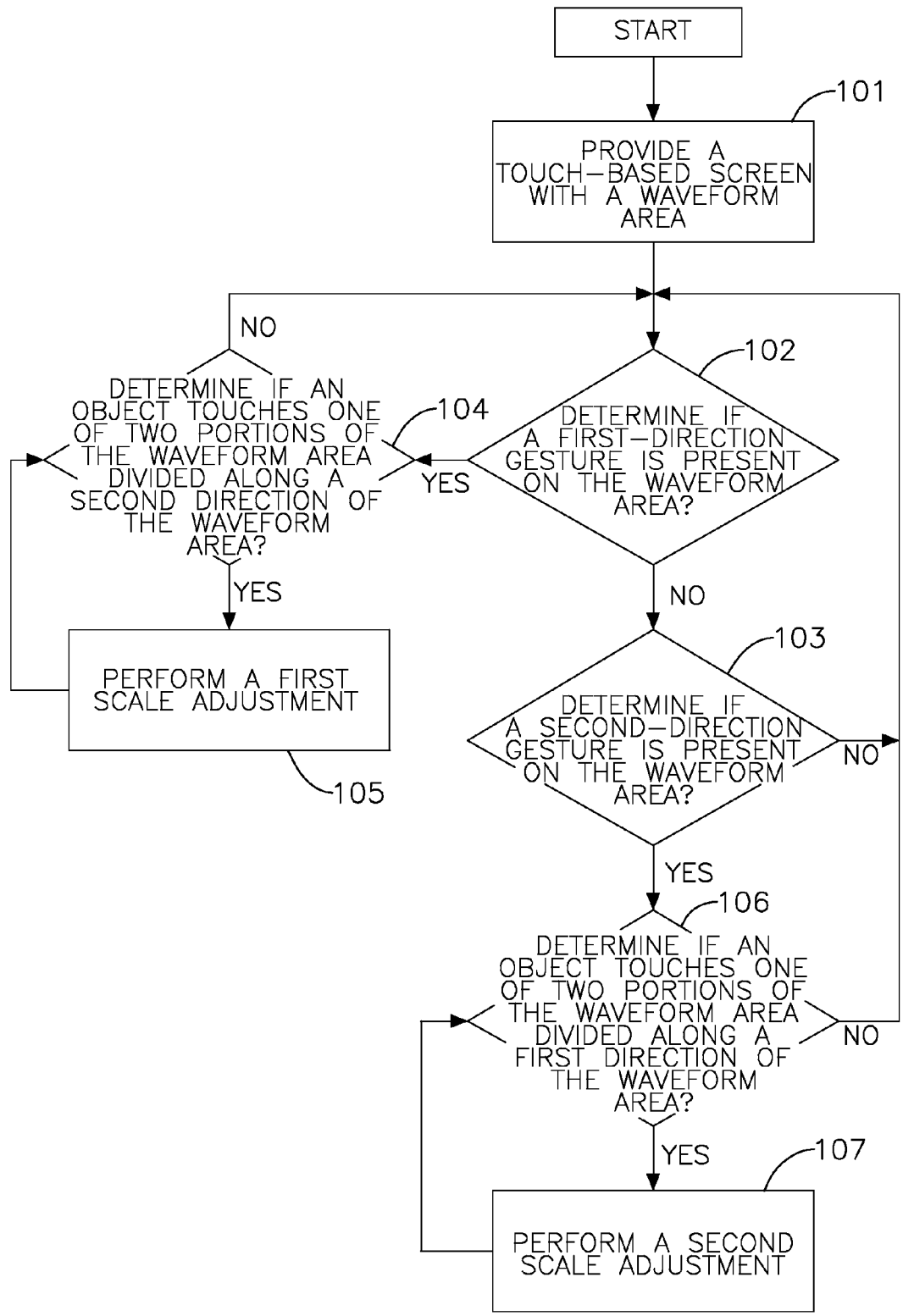
FIG. 1 is a flow diagram of a method for scale adjustment of touch-based measurement equipment.

With reference to FIG. 1, a method for scale adjustment of touch-based measurement equipment has the following steps.

Step 101: Provide a touch-based screen with a waveform area.

Step 102: Determine if a first-direction gesture is present on the waveform area. If positive, perform Step 104.

Step 103: Determine if a second-direction gesture is present on the waveform area. If positive, perform Step 106.

Step 104: Determine if an object touches one of two portions of the waveform area divided along a second direction of the waveform area. If negative, resume Step 102.

Step 105: Perform a first scale adjustment and return to Step 104.

Step 106: Determine if an object touches one of two portions of the waveform area divided along a first direction of the waveform area. If negative, resume Step 102.

Step 107: Perform a second scale adjustment and return to Step 106.

Figure 2:
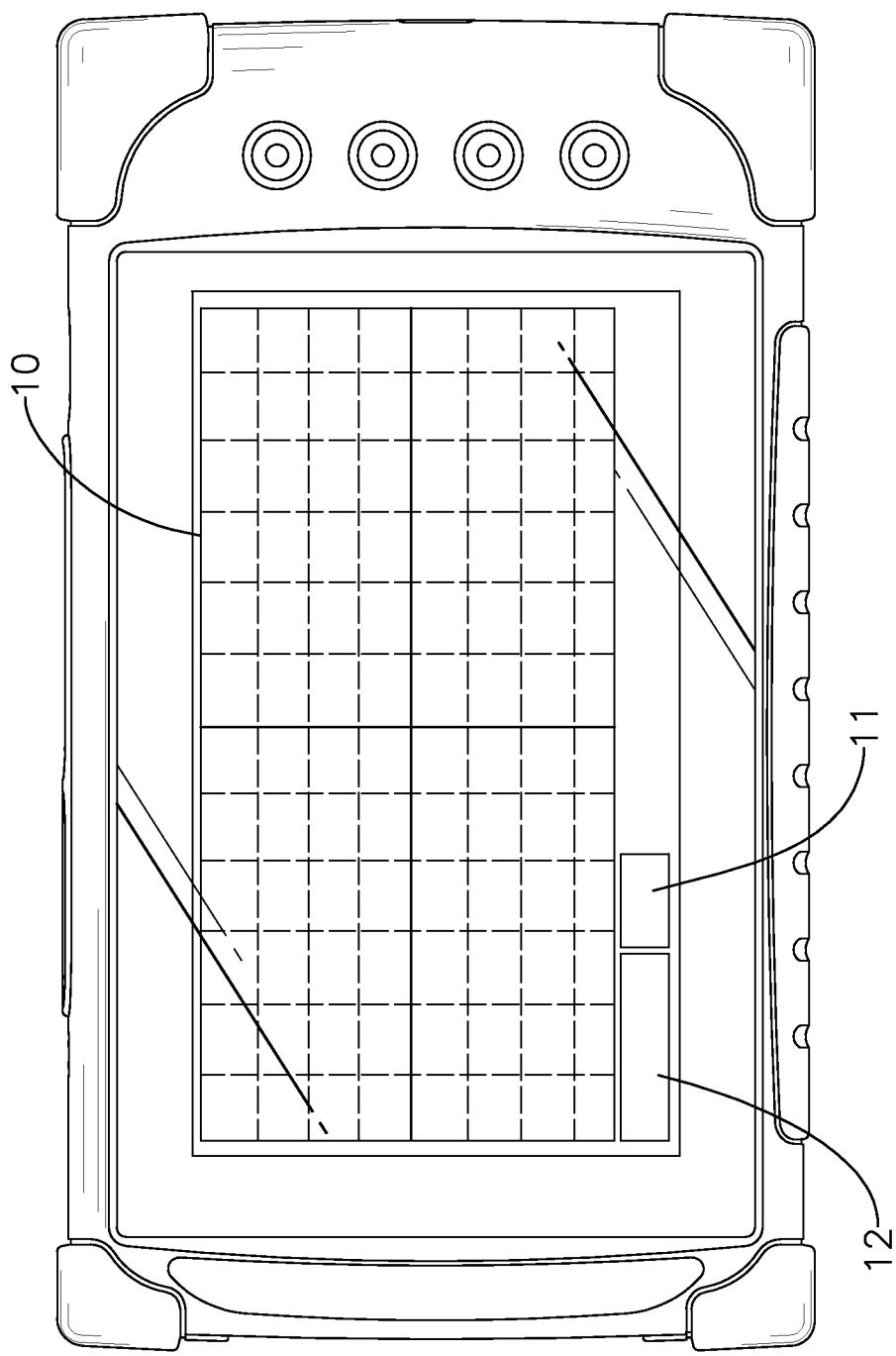
FIGS. 2 to 8 are operational schematic views of a touch screen performing the method in FIG. 1.

With reference to FIG. 2, a touch screen performing the foregoing method has a waveform area 10 and multiple virtual buttons. In the present embodiment, the touch screen has two virtual buttons 11, 12. The two virtual buttons 11, 12 are used to activate generation of a window for scale adjustment in a first direction (horizontal direction) and a window for scale adjustment in a second direction (vertical direction), which is similar to that of prior art and is therefore not repeated here.

The touch screen is relatively convenient in operation because of the waveform area 10 with a relatively larger area for operation of scale adjustment.

Since whether the scale adjustment is performed or not depends on the presence of particular gestures and objects on the waveform area 10, in-depth description of Steps 102 to 107 is given as follows.

Figure 3:
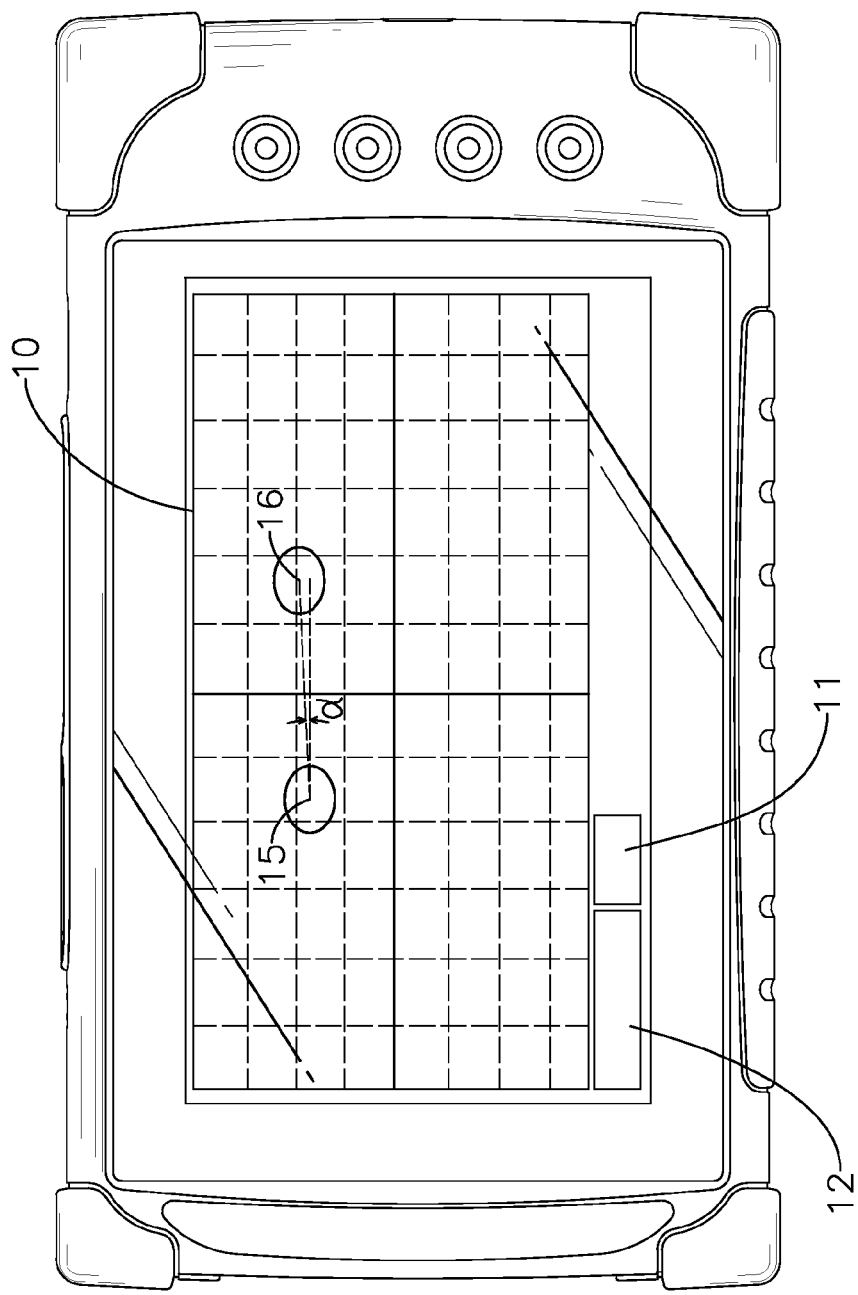

With reference to FIG. 3, regarding Step 102, the first-direction gesture is determined to be present when two fingers simultaneously touch two separate points 15, 16 on the waveform area and an inclination angle α included between a line passing through the two points 15, 16 and the first direction of the waveform area 10 is less than a first-gesture angle threshold, e.g. 45 degrees. After the first-direction gesture is determined, a first scale adjustment mode is entered for users to adjust a first scale. As the present embodiment is associated with an oscilloscope, the first scale indicates the scale of time for testing signals.

Figure 4:
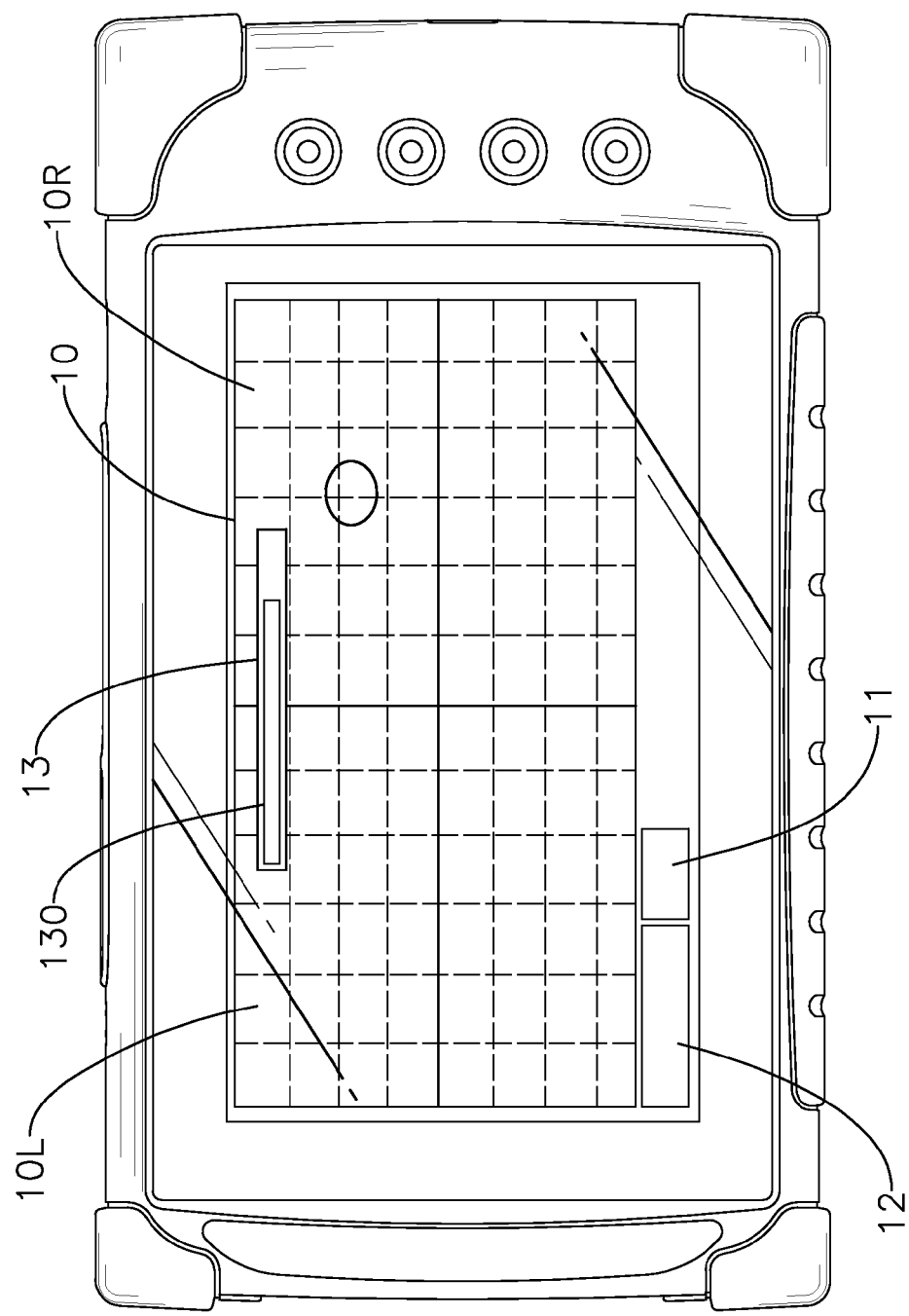
Figure 5:
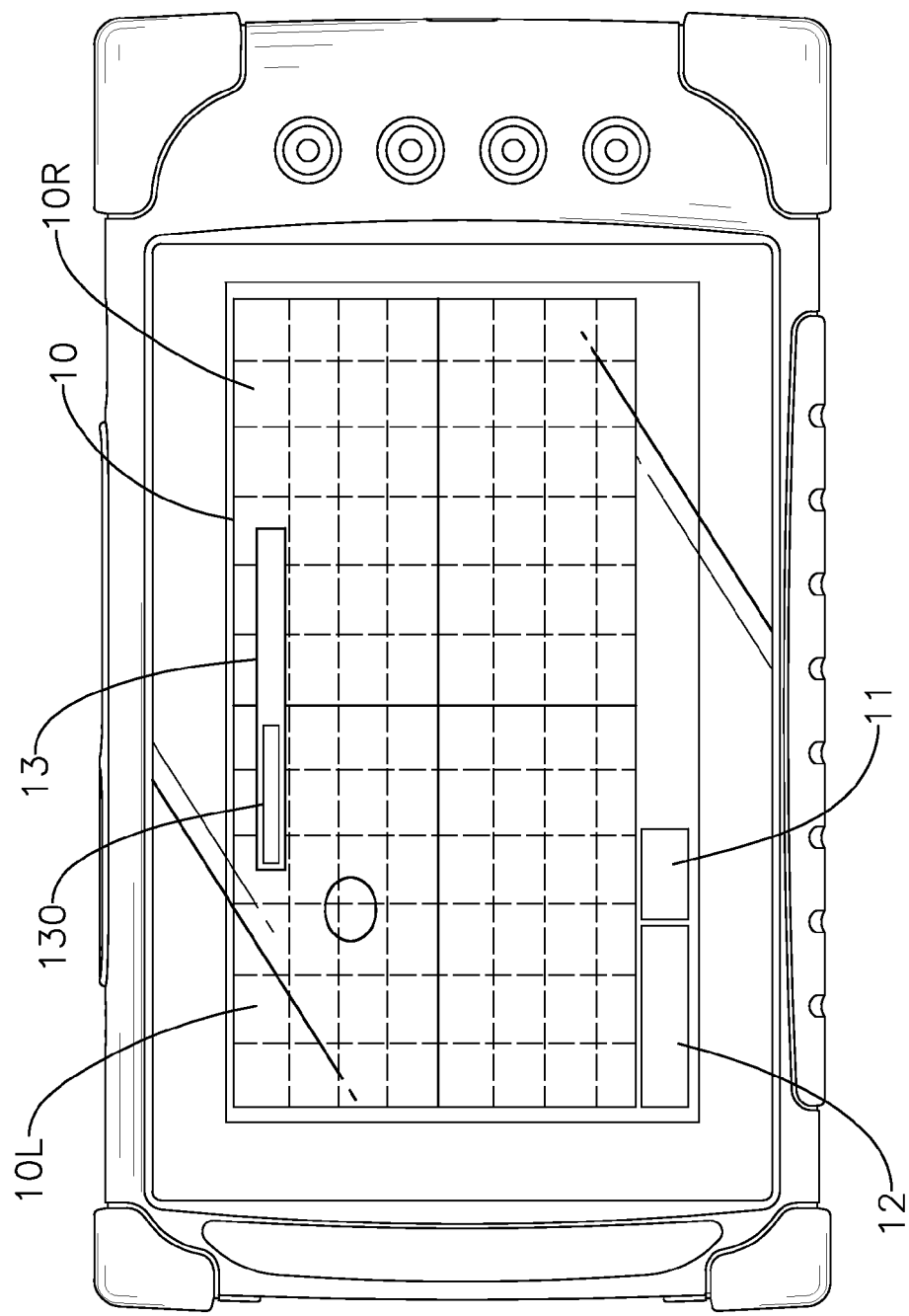

With reference to FIG. 4, after the first scale adjustment mode is entered, for the convenience of users' operation for scale adjustment, a first scale adjustment bar 13 is displayed on the waveform area 10 and is elongated in the horizontal direction of the waveform area 10 and is located on a top portion of the waveform area 10.

After the first scale adjustment mode is entered, the first scale adjustment is performed (Step 105) after Step 104 determines that an object touches either one of two portions of the waveform area 10 divided along the second direction (horizontal direction) of the waveform area 10. In the present embodiment, the waveform area 10 is divided into two zones, which are a left zone 10L and a right zone 10R, by a vertical center line of the waveform area 10 along the second direction. Specifically, Step 104 determines if the left zone 10L or the right zone 10R of the waveform area 10 is touched by an object. In the present embodiment, the object is a single finger. When a touch event on the right zone 10R of the waveform area 10 is detected, the first scale is incremented by one first scale unit. In other words, the time scale of testing signals is moved up by one scale unit in time. The time scale is incremented by one scale unit in time upon detection of each touch event on the right zone 10R of the waveform area 10. Hence, users' single-finger touch can achieve stepwise scale adjustment. To facilitate user awareness of the scale adjustment, the first scale adjustment bar 13 also has a first scale reading 130 synchronous with the first scale adjustment. On the other hand, when a touch event on the left zone 10L of the waveform area 10 is detected, the first scale is decremented by one first scale unit. In other words, the time scale of testing signals is moved down by one scale unit in time. The time scale is decremented by one scale unit in time upon detection of each touch event on the left zone 10L of the waveform area 10. The first scale reading 130 of the first scale adjustment bar 13 is increased or decreased in a stepwise manner when the first scale is incremented or decremented.

Figure 6:
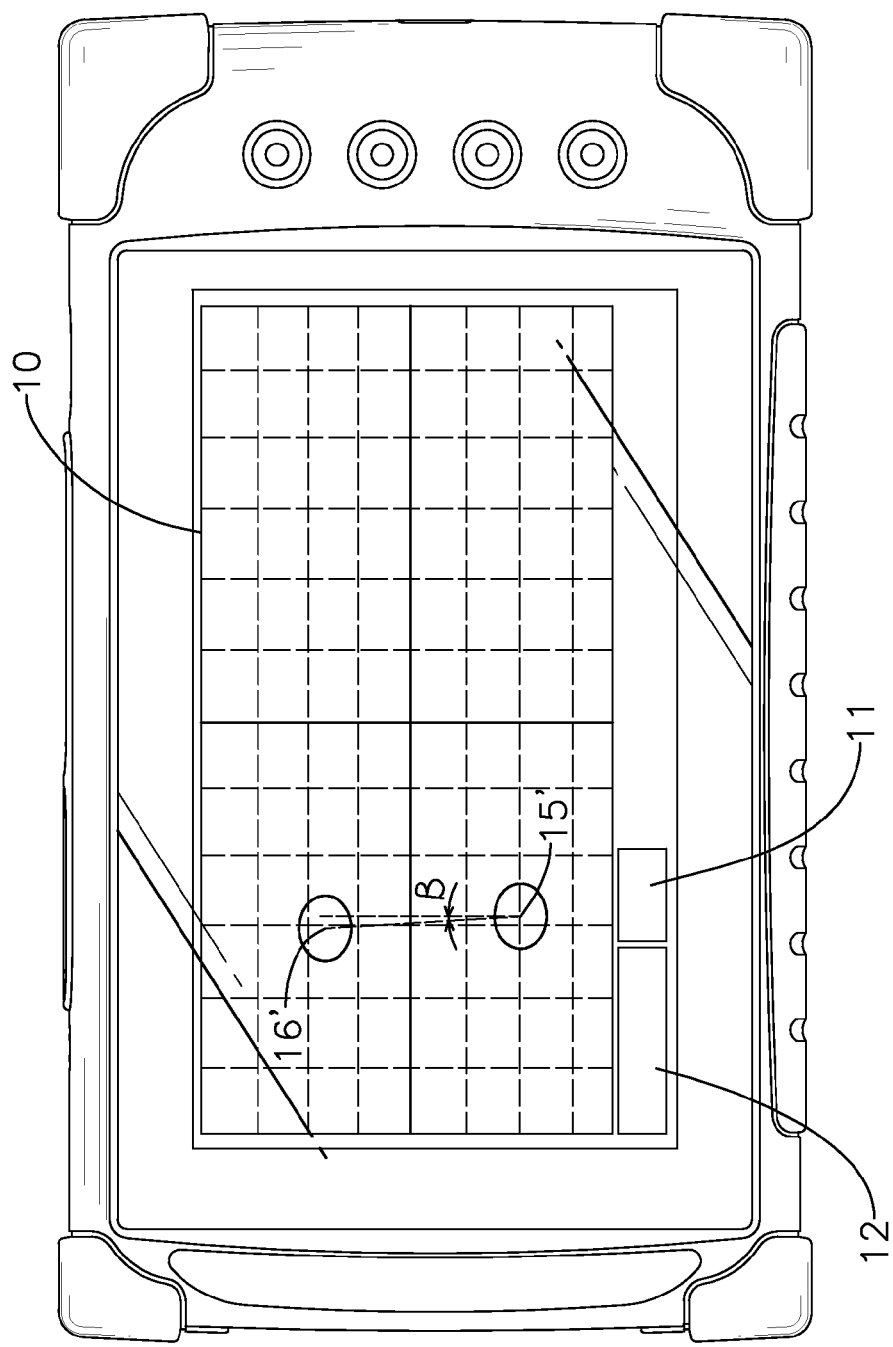

When Step 102 detects no first-direction gesture, Step 103 further determines if the second-direction gesture is present. When no second-direction gesture is detected, a second scale adjustment mode is entered. With reference to FIG. 6, the second-direction gesture is determined to be present when two fingers simultaneously touch two separate points 15', 16' on the waveform area and an inclination angle β included between a line passing through the two points 15' 16' and the second direction, which is a vertical direction of the waveform area 10, is less than a second-gesture angle threshold, e.g. 45 degrees. After the second-direction gesture is determined, the second scale adjustment mode is entered for users to adjust a second scale. As the present embodiment is associated with an oscilloscope, the second scale indicates the scale of magnitude for testing signals.

Figure 7:
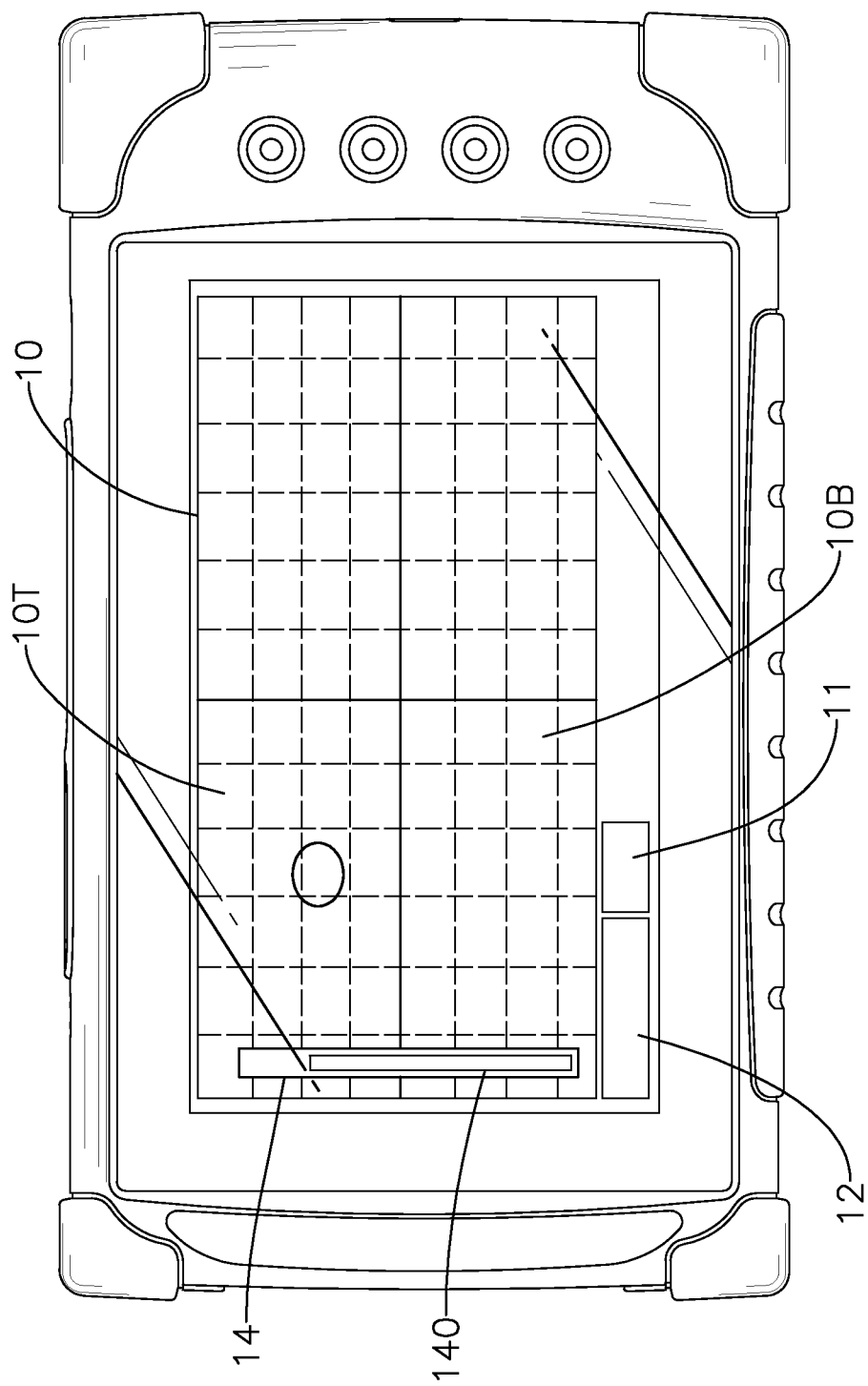
Figure 8:
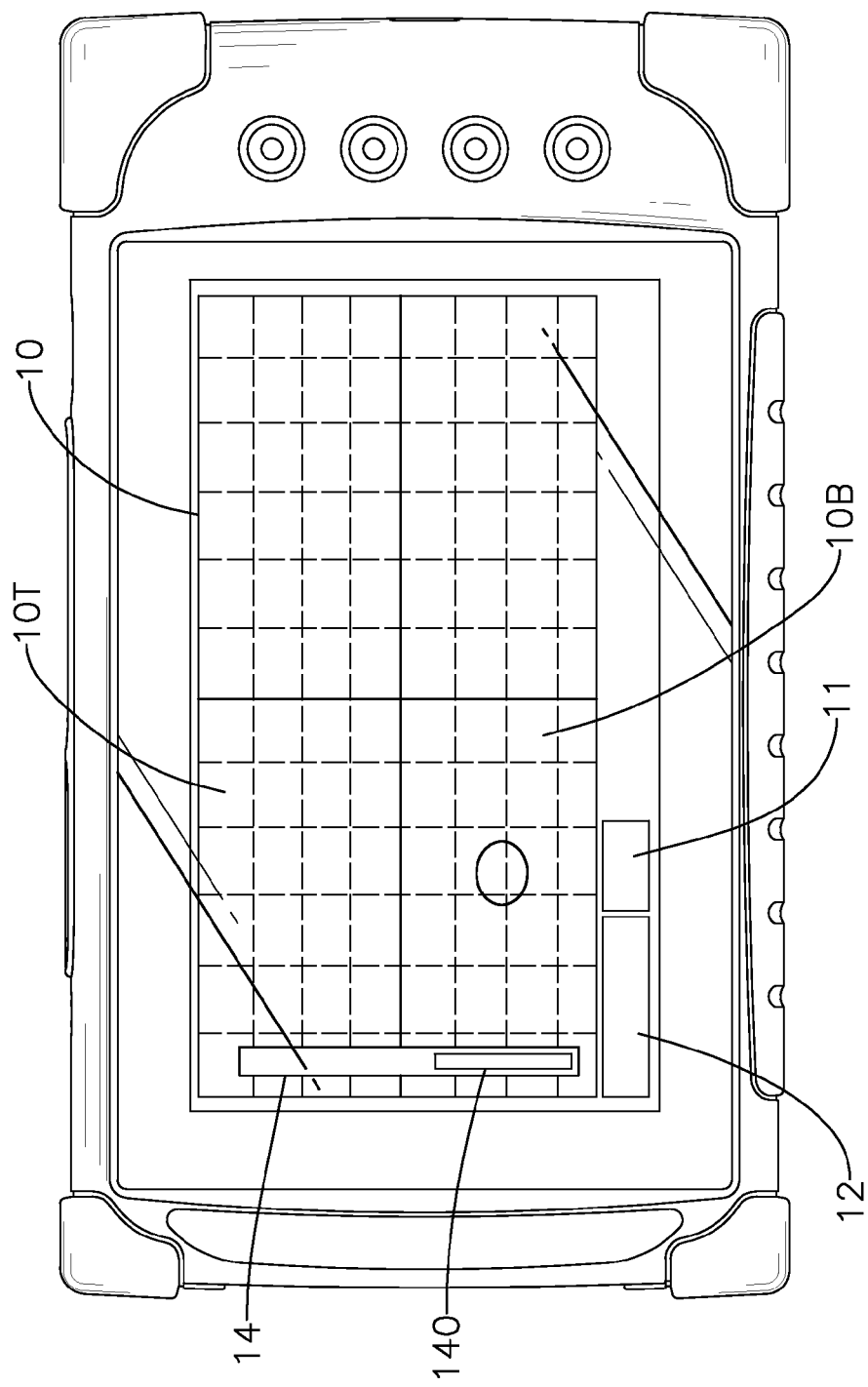
Figure 9:
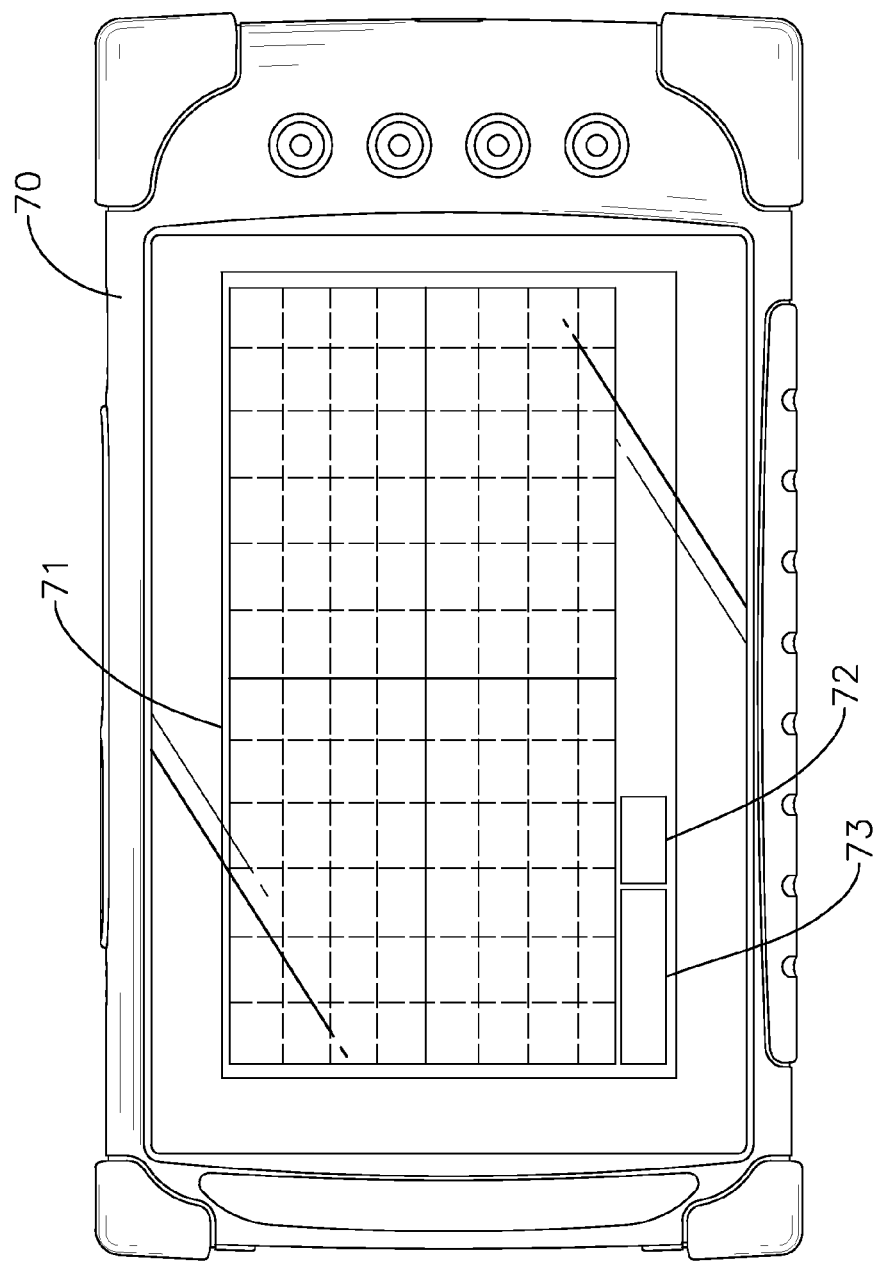
FIG. 9 is an operational schematic view of conventional touch-based measurement equipment.
Figure 10:
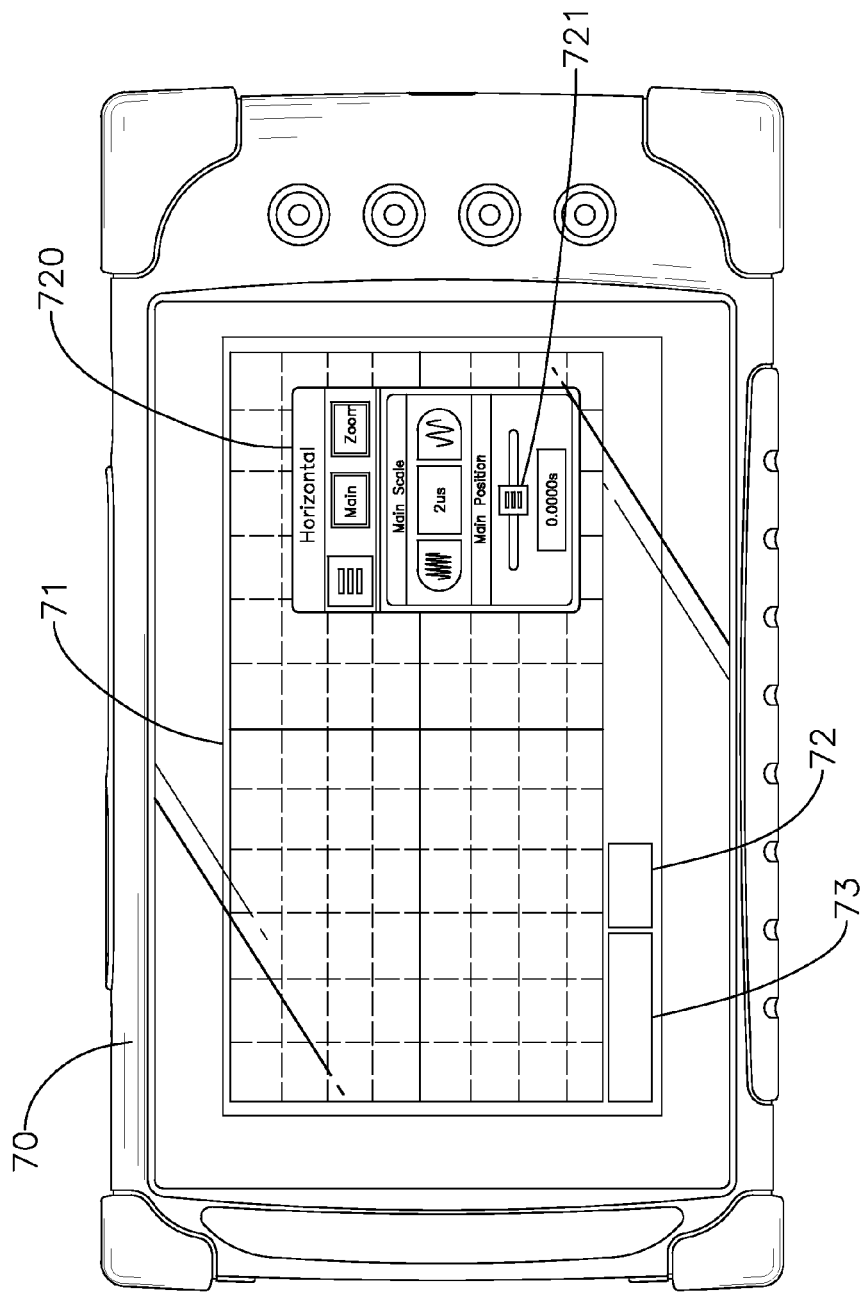
FIGS. 10 to 11 are operational schematic views of the conventional touch-based measurement equipment using virtual buttons displayed thereon to perform scale adjustment.
Figure 11:
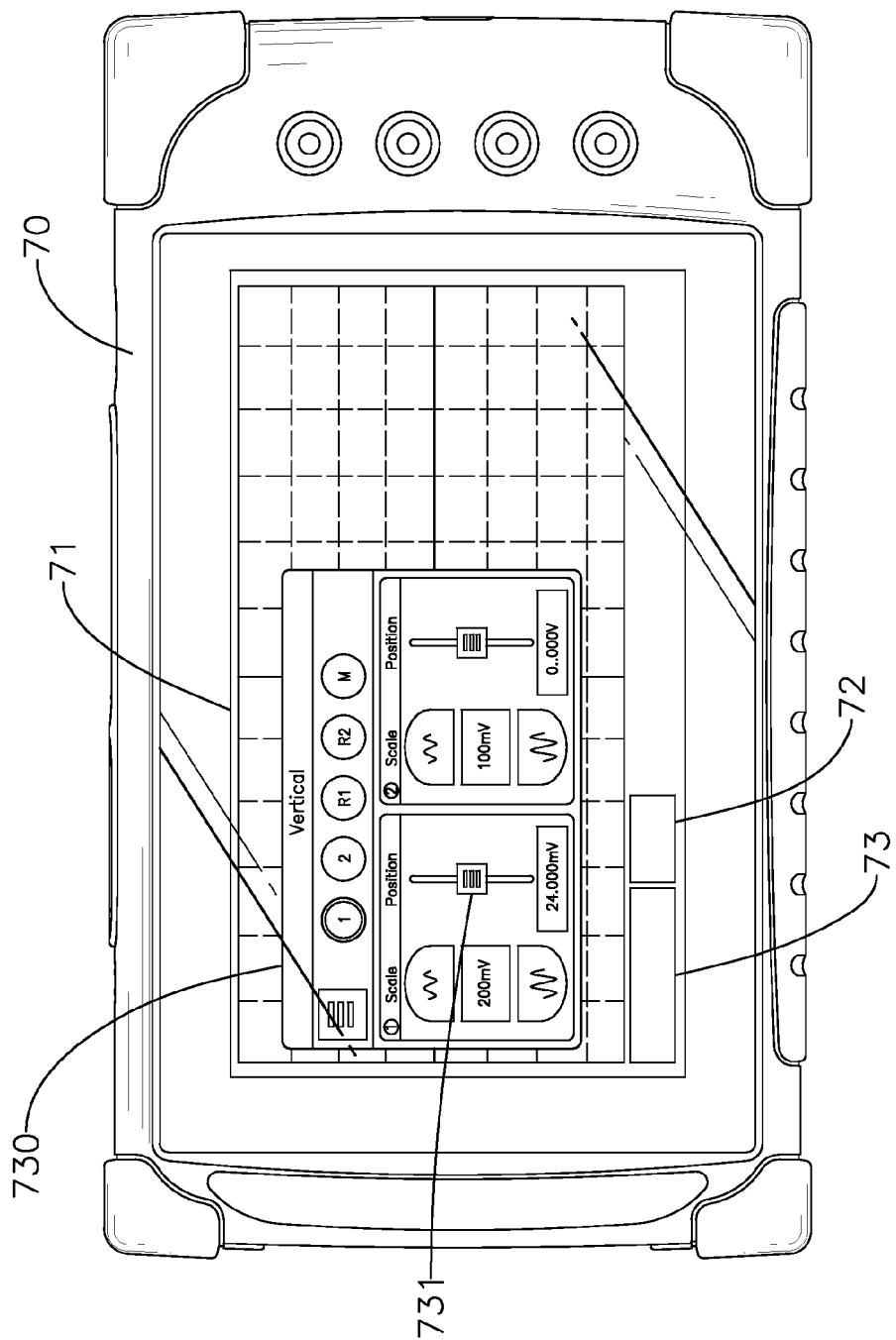

With reference to FIG. 7, after the second scale adjustment mode is entered, for the convenience of users' scale adjustment operation, a second scale adjustment bar 14 is displayed on the waveform area 10 and is elongated in the vertical direction of the waveform area 10 and is located on a lateral side portion of the waveform area 10.

After the second scale adjustment mode is entered, the second scale adjustment is performed (Step 107) after Step 106 determines that an object touches either one of two portions of the waveform area 10 divided along the first direction. In the present embodiment, the waveform area 10 is divided into two zones, which differ from the divisions of the waveform area 10 in Step 103 and are a top zone 10T and a bottom zone 10B, by a horizontal center line along the first direction. Specifically, Step 106 determines if the top zone 10T or the bottom zone 10B of the waveform area 10 is touched by an object. In the present embodiment, the object is a single finger. When a touch event on the top zone 10T of the waveform area 10 is detected, the second scale is incremented by one second scale unit. In other words, the magnitude scale of testing signals is moved up by one scale unit in magnitude. The magnitude scale is incremented by one scale unit in magnitude upon detection of each touch event on the right zone 10R of the waveform area 10. The second scale adjustment bar 14 also has a second scale reading 140 synchronous with the second scale adjustment. On the other hand, when a touch event on the bottom zone 10B of the waveform area 10 is detected, the second scale is decremented by one second scale unit. In other words, the magnitude scale of testing signals is moved down by one scale unit in magnitude. The magnitude scale is decremented by one scale unit in magnitude upon detection of each touch event on the bottom zone 10B of the waveform area 10. The second scale reading 140 of the second scale adjustment bar 14 is increased or decreased in a stepwise manner when the second scale is incremented or decremented.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for scale adjustment in touch-based measurement equipment, comprising steps of:
   providing a touch-based screen of measurement equipment with a waveform area;
   determining if a first-direction gesture or a second-direction gesture is present on the waveform area,
   wherein the first-direction gesture is determined to be present on the waveform area when two fingers simultaneously touch two separate points on the waveform area and a first inclination angle included between a line passing through the two points and a first direction of the waveform area is less than a threshold,
   wherein the second direction gesture is determined to be present on the waveform area when two fingers simultaneously touch two separate points on the waveform area and a second inclination angle included between a line passing through the two points and a second direction of the waveform is less than a threshold;
   when the first-direction gesture is determined to be present, incrementing or decrementing a first scale of testing signals in a stepwise manner under a first scale adjustment mode; and
   when the second-direction gesture is determined to be present, incrementing or decrementing a second scale of testing signals in a stepwise manner under a second scale adjustment mode,
   wherein when the first-direction gesture is determined to be present on the waveform area, the first scale adjustment mode is entered and a first scale adjustment bar is displayed elongated in the first direction on the waveform area, and when the second-direction gesture is determined to be resent on the waveform area, the second scale adjustment mode is entered and a second scale adjustment bar is displayed elongated in the second direction on the waveform area.

2. The method as claimed in claim 1, wherein the first scale adjustment bar has a first scale reading synchronous with the first scale adjusted under the first scale adjustment mode, and the second scale adjustment bar has a second scale reading synchronous with the second scale adjusted under the second scale adjustment mode.

3. The method as claimed in claim 2, wherein
   the first-direction gesture is determined to be present on the waveform area when two fingers simultaneously touch two separate points on the waveform area and a first inclination angle included between a line passing through the two points and the first direction of the waveform area is less than forty-five degrees; and
   the second-direction gesture is determined to be present on the waveform area when two fingers simultaneously touch two separate points on the waveform area and a second inclination angle included between a line passing through the two points and the second direction of the waveform area is less than forty-five degrees.

4. The method as claimed in claim 3, wherein a unit of the first scale is time, and a unit of the second scale is magnitude.

5. The method as claimed in claim 3, wherein the measuring equipment is an oscilloscope.

6. The method as claimed in claim 1, wherein after the first scale adjustment mode is entered, the waveform area is divided into a left zone and a right zone by a center line of the waveform area along the second direction, when a touch event on the right zone of the waveform area is detected, the first scale is incremented by a first scale unit, and when a touch event on the left zone of the waveform area is detected, the first scale is decremented by the first scale unit.

7. The method as claimed in claim 6, wherein
   the first-direction gesture is determined to be present on the waveform area when two fingers simultaneously touch two separate points on the waveform area and a first inclination angle included between a line passing through the two points and the first direction of the waveform area is less than forty-five degrees; and
   the second-direction gesture is determined to be present on the waveform area when two fingers simultaneously touch two separate points on the waveform area and a second inclination angle included between a line passing through the two points and the second direction of the waveform area is less than forty-five degrees.

8. The method as claimed in claim 7, wherein a unit of the first scale is time, and a unit of the second scale is magnitude.

9. The method as claimed in claim 7, wherein the measuring equipment is an oscilloscope.

10. The method as claimed in claim 1, wherein after the second scale adjustment mode is entered, the waveform area is divided into a top zone and a bottom zone by a center line of the waveform area along the second direction, when a touch event on the top zone of the waveform area is detected, the second scale is incremented by a second scale unit, and when a touch event on the bottom zone of the waveform area is detected, the second scale is decremented by the second scale unit.

11. The method as claimed in claim 10, wherein
   the first-direction gesture is determined to be present on the waveform area when two fingers simultaneously touch two separate points on the waveform area and a first inclination angle included between a line passing through the two points and the first direction of the waveform area is less than forty-five degrees; and
   the second-direction gesture is determined to be present on the waveform area when two fingers simultaneously touch two separate points on the waveform area and a second inclination angle included between a line passing through the two points and the second direction of the waveform area is less than forty-five degrees.

12. The method as claimed in claim 11, wherein a unit of the first scale is time, and a unit of the second scale is magnitude.

13. The method as claimed in claim 11, wherein the measuring equipment is an oscilloscope.

14. The method as claimed in claim 1, wherein the waveform area has two virtual buttons displayed thereon to activate generation of a window for scale adjustment in the first direction of the waveform area and a window for scale adjustment in the second direction of the waveform area.

15. The method as claimed in claim 14, wherein
the first-direction gesture is determined to be present on the waveform area when two fingers simultaneously touch two separate points on the waveform area and a first inclination angle included between a line passing through the two points and the first direction of the waveform area is less than forty-five degrees; and
the second-direction gesture is determined to be present on the waveform area when two fingers simultaneously touch two separate points on the waveform area and a second inclination angle included between a line passing through the two points and the second direction of the waveform area is less than forty-five degrees.

16. The method as claimed in claim 15, wherein a unit of the first scale is time, and a unit of the second scale is magnitude.

17. The method as claimed in claim 15, wherein the measuring equipment is an oscilloscope.

18. The method as claimed in claim 1, wherein
the first-direction gesture is determined to be present on the waveform area when two fingers simultaneously touch two separate points on the waveform area and a first inclination angle included between a line passing through the two points and the first direction of the waveform area is less than forty-five degrees; and
the second-direction gesture is determined to be present on the waveform area when two fingers simultaneously touch two separate points on the waveform area and a second inclination angle included between a line passing through the two points and the second direction of the waveform area is less than forty-five degrees.

19. The method as claimed in claim 18, wherein a unit of the first scale is time, and a unit of the second scale is magnitude.

20. The method as claimed in claim 18, wherein the measuring equipment is an oscilloscope.

* * * * *